(12) United States Patent
Bostick et al.

(10) Patent No.: US 10,455,037 B2
(45) Date of Patent: *Oct. 22, 2019

(54) SYSTEMS AND METHODS TO ANONYMIZE WEB BROWSING

(71) Applicant: INTERNATIONAL BUSINESS MACHINES CORPORATION, Armonk, NY (US)

(72) Inventors: James E. Bostick, Cedar Park, TX (US); Jia Chen, Ossining, NY (US); Wing L. Leung, Austin, TX (US); Craig M. Trim, Sylmar, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 311 days.

This patent is subject to a terminal disclaimer.

(21) Appl. No.: 15/379,151

(22) Filed: Dec. 14, 2016

(65) Prior Publication Data

US 2018/0167479 A1 Jun. 14, 2018

(51) Int. Cl.
*H04L 29/08* (2006.01)
*H04L 29/12* (2006.01)
*H04L 29/06* (2006.01)

(52) U.S. Cl.
CPC .......... *H04L 67/28* (2013.01); *H04L 61/2007* (2013.01); *H04L 61/2061* (2013.01); *H04L 63/0471* (2013.01); *H04L 63/123* (2013.01); *H04L 63/1483* (2013.01); *H04L 67/02* (2013.01); *H04L 67/1025* (2013.01); *H04L 67/141* (2013.01)

(58) Field of Classification Search
CPC ............. H04L 63/0421; H04L 43/0876; H04L 63/1483; H04L 63/1416; H04L 63/123; H04L 63/0428; H04L 63/0471; H04L 67/02

See application file for complete search history.

(56) References Cited

U.S. PATENT DOCUMENTS 5,961,593 A 10/1999 Gabber et al.
8,402,011 B1 3/2013 Bodenhamer
8,458,349 B2 6/2013 Brunell et al.
(Continued)

OTHER PUBLICATIONS

Disclosed Anonymously, "Authentication Infrastructure Extensions to Support Anonymous Credential", An IP.com Prior Art Database Technical Disclosure, IP.com No. IPCOM000206843D, May 10, 2011, 4 pp.
(Continued)

*Primary Examiner* — Chirag R Patel
(74) *Attorney, Agent, or Firm* — Toler Law Group, PC

(57) ABSTRACT

A method includes sending one or more messages, from a computing device to a server, to cause the server to establish a connection with the computing device, to cause the server to identify a first set of anonymization characteristics, and to cause the server to instantiate a first instance of an access application within a first cloud container using the first set of anonymization characteristics. The method also includes receiving, by the computing device, second data from the server via the connection. The second data is determined based on first data received by the server from a first website using the first instance of the access application.

20 Claims, 6 Drawing Sheets

(56) References Cited

U.S. PATENT DOCUMENTS

| | | | |
|---|---|---|---|
| 8,874,755 | B1 | 10/2014 | Deklich et al. |
| 9,104,858 | B1 | 8/2015 | Sundaram et al. |
| 9,137,210 | B1 | 9/2015 | Joglekar et al. |
| 9,595,051 | B2 | 3/2017 | Stack et al. |
| 2014/0283068 | A1* | 9/2014 | Call .................... H04L 63/1425 726/23 |
| 2015/0207780 | A1 | 7/2015 | Grier |
| 2015/0363724 | A1 | 12/2015 | Chatterjee et al. |
| 2016/0344736 | A1* | 11/2016 | Khait ................. H04L 63/0807 |
| 2018/0089676 | A1 | 3/2018 | Narasiman et al. |

OTHER PUBLICATIONS

Disclosed Anonymously, "Services for Providing Enterprise Security Enhancement", An IP.com Prior Art Database Technical Disclosure, IP.com No. IPCOM000202163D, Dec. 6, 2010, 3 pp.

"List of IBM Patents or Patent Applications Treated as Related", 2 pages, Apr. 24, 2019.

"Evercookie", https://en.wikipedia.org/wiki/Evercookie, Dec. 3, 2018.

"HowTo: Privacy & Security Conscious Browsing", https://gist.github.com/atcuno/3425484ac5cce5298932.

"ITU releases 2015 ICT figures", http://www.itu.int/net/pressoffice/press_releases/2015/17.aspx#Vi6VxOcro_V, May 26, 2015.

"Panopticlick 3.0; Is your browser safe against tracking?", https://panopticlick.eff.org/about.

"Performance Characteristics of Traditional VMs vs Docker Containers", Jun. 11, 2014.

"Will the cookies crumble when it comes to proxy servers?", http://security.stackexchange.com/questions/67748/will-the-cookies-crumble-when-itcomes-to-proxy-servers.

* cited by examiner

SYSTEMS AND METHODS TO ANONYMIZE WEB BROWSING

I. FIELD OF THE DISCLOSURE

The present application relates to anonymizing web browsing.

II. BACKGROUND

Websites may track users based on internet protocol (IP) address used by computing devices (of the users) that access the websites. Additionally, websites may track users based on attributes associated with internet browser applications that are used by computing devices (of the users) to access the websites.

III. SUMMARY OF THE DISCLOSURE

In a particular implementation, a method includes sending one or more messages, from a computing device to a server, to cause the server to establish a connection with the computing device, to cause the server to identify a first set of anonymization characteristics, and to cause the server instantiate a first instance of an access application within a first cloud container using the first set of anonymization characteristics. The method also includes receiving, by the computing device, second data from the server via the connection. The second data is determined based on first data received by the server from a first website using the first instance of the access application.

In a particular implementation, an apparatus includes a memory storing processor-executable instructions. The apparatus includes one or more processors coupled to the memory and configured to execute the processor-executable instructions. The processor-executable instructions, when executed by the one or more processors, cause the one or more processors to initiate sending of one or more messages to a server to cause the server to establish a connection with a computing device that includes the one or more processors, to cause the server to identify a first set of anonymization characteristics, and to cause the server to instantiate a first instance of an access application within a first cloud container using the first set of anonymization characteristics. The processor-executable instructions, when executed by the one or more processors, further cause the one or more processors to receive second data from the server via the connection. The second data is determined based on first data received by the server from a first website using the first instance of the access application.

In a particular implementation, a non-transitory processor-readable medium stores processor-executable instructions that, when executed by one or more processors, cause the one or more processors to initiate sending of one or more messages to a server to cause the server to establish a connection with a computing device that includes the one or more processors, to cause the server to identify a first set of anonymization characteristics, and to cause the server to instantiate a first instance of an access application within a first cloud container using the first set of anonymization characteristics. When executed by the one or more processors, the processor-executable instructions additionally cause the one or more processors to receive second data from the server via the connection. The second data is determined based on first data received by the server from a first website using the first instance of the access application.

IV. BRIEF DESCRIPTION OF THE DRAWINGS

V. DETAILED DESCRIPTION

Systems described below enable a user of a computing device to browse the internet or perform other remote data access operations using a server as a proxy. For example, during a browsing session, the user's computing device and a proxy server may establish and maintain a connection that enables data transfer between the computing device and the proxy server. During the browsing session, the proxy server accesses websites responsive to direction from the computing device, and the proxy server provides (via the established connection) data to the computing device of the user enabling the user to experience browsing the desired websites without the computing device interacting with servers of the websites. Additionally, during each browsing session, the proxy server interacts with websites using one or more instances of an access application that are instantiated for use during the browsing session. For example, as described in more detail below, the proxy server may be configured to instantiate an instance of the access application for each browsing session (e.g., one instantiation per connection). Alternatively, the proxy server may be configured to instantiate a new instance of the access application for each website navigated to (e.g., by a user of the computing device) during a browsing session. Each instance of the access application is instantiated within a separate cloud container and is instantiated using randomly or pseudo-randomly assigned anonymization characteristics (e.g., browser attributes) that are identified by the proxy server for the particular instance. Each cloud container is randomly or pseudo-randomly assigned a communication address within a range of addresses associated with a cloud. Although the operations performed by the proxy server are described as web browsing operations, the operations performed by the proxy server can be any remote data access operation, such as database queries, etc.

Figure 1:
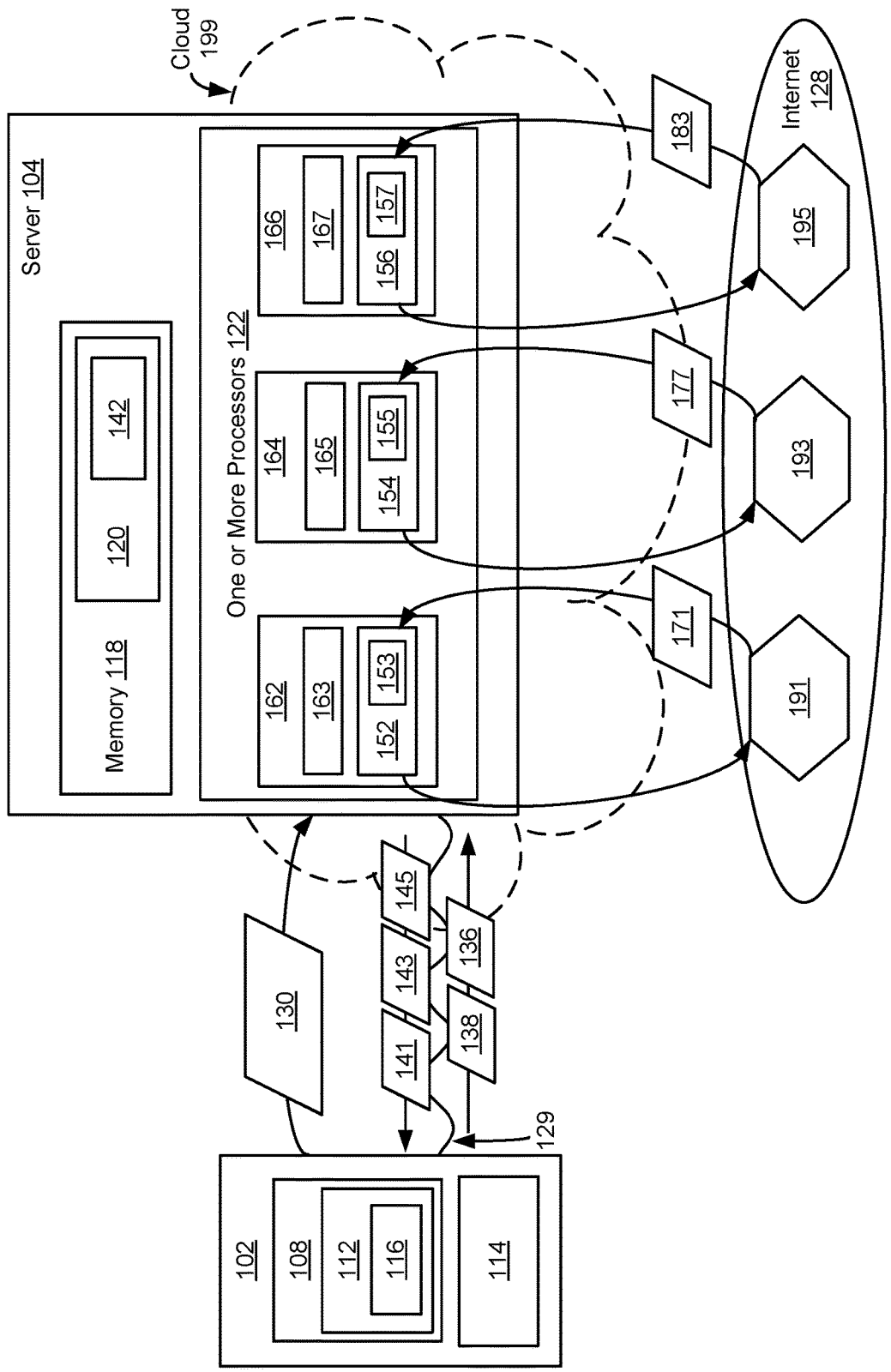
FIG. 1 illustrates a system for anonymous web browsing using a server as a proxy for a computing device to access one or more websites during one or more browsing sessions.

FIG. 1 illustrates a system 100 for anonymous web browsing. The system 100 includes a computing device 102 (e.g., a client device or a user device) and a server 104.

The server 104 includes a non-transitory processor-readable medium (e.g., memory) 118 storing processor-executable instructions 120. The server 104 also includes one or more processors 122 configured to execute the processor-executable instructions 120. In some examples, the server 104 may correspond to a cloud server that provides services via a public cloud 199. In some examples, the server 104 includes multiple servers.

The computing device 102 may be any device configured with internet browsing or remote data access capability. For example, the computing device 102 may include a mobile phone, a tablet computer, a laptop computer, or a desktop computer. The computing device 102 includes a non-transitory processor-readable medium (e.g., a memory) 108 storing processor-executable instructions 112. The processor-executable instructions 112 may include an application program 116 (e.g., a wrapper application program). The application program 116 may correspond to or include a browser application program, a browser plug-in, a connection manager application, or a virtual private network (VPN) application. The computing device 102 also includes one or more processors 114 to execute the processor-executable instructions 112 (e.g., to execute the application program 116). The application program 116 may enable a user to anonymously browse the internet 128 using the server 104 as a proxy. Although the application program 116 is primarily described as being used in a web browsing context to perform anonymous web browsing, the application program 116 may be used in the context of other remote data access operations, such as database queries, etc.

A user may provide input to an interface of the computing device 102 to activate, initiate, or execute the application program 116 during a browsing session, such as a first browsing session or a second browsing session subsequent to the first browsing session. The one or more processors 114 may execute the application program 116 responsive to the activation input from the user.

When executed by the one or more processors 114, the processor-executable instructions 112 (e.g., the application program 116) cause the computing device 102 to interact with the server 104 to establish a connection 129 between the computing device 102 and the server 104. The connection 129 enables data transfer between the computing device 102 and the server 104 during a browsing session. For example, during initiation of the first browsing session, the processor-executable instructions 112 (e.g., the application program 116), when executed by the one or more processors 114, may initiate sending of (e.g., may cause the computing device 102 to send) one or more messages 130 associated with the first browsing session to the server 104. The one or more messages 130 associated with the first browsing session cause the server 104 to establish the connection 129 corresponding to the first browsing session. In response to the one or more messages 130 associated with the first browsing session, the processor-executable instructions 120, when executed by the one or more processors 122, cause the one or more processors 122 to establish the connection 129 (associated with the first browsing session) between the server 104 and the computing device 102. As another example, during initiation of the second browsing session, the processor-executable instructions 112 (e.g., the application program 116), when executed by the one or more processors 114, may initiate sending of (e.g., may cause the computing device 102 to send) the one or more messages 130 associated with the second browsing session to the server 104. The one or more messages 130 associated with the second browsing session may cause the server 104 to establish the connection 129 corresponding to the second browsing session. For example, when the connection 129 is not already established, the one or more messages 130 associated with the second browsing session cause the server 104 to establish the connection 129. In response to the one or more messages 130 associated with the second browsing session, the processor-executable instructions 120, when executed by the one or more processors 122, cause the one or more processors 122 to establish the connection 129 (associated with the second browsing session) between the server 104 and the computing device 102.

The connection 129 may be used during a browsing session to enable transfer of browser-related data between the server 104 and the computing device 102. In some examples, when the browsing session is completed, the connection 129 is terminated. Upon initiation of a new browsing session, a new connection is established. For example, the connection 129 corresponding to the first browsing session may be used to enable transfer data associated with one or more websites navigated to during the first browsing session as described in more detail below. The connection 129 may be terminated when the first browsing session ends. Subsequent to termination of the connection 129 associated with the first browsing session, the connection 129 may be established for the second browsing session upon initiation of the second browsing session. Thus, the connection 129 may be established between the computing device 102 and the server 104 for each browsing session. Alternatively, the connection 129 may not automatically be terminated upon completion of a browsing session. In these examples, the connection 129 may be maintained during periods between browsing sessions and a browsing session that is initiated when the connection 129 (established for a preceding browsing session) already exists may use the existing connection.

In some examples, the connection 129 is a secure connection. To illustrate, the connection 129 may be encrypted according to one or more security protocols to protect the security of data flowing between the computing device 102 and the server 104. In some examples, the connection 129 is a virtual private network (VPN) connection.

In some examples, the processor-executable instructions 120, when executed by the one or more processors 122, may cause the one or more processors 122 to, for each website visited (e.g., during a browsing session), identify a set of anonymization characteristics for the website, create a cloud container for the website, and instantiate an instance of an access application within the cloud container using the anonymization characteristics identified for the website. Although the description focuses on use of cloud containers, in other implementations, the cloud containers described below (e.g., the cloud containers 162, 164, or 166) may correspond to virtual machines.

To illustrate, during the first browsing session, the computing device 102 may indicate (e.g., based on the one or more messages 130 associated with the first browsing session) a desire to browse a first website 191. In this example, the one or more processors 114 executing the processor-executable instructions 112 (e.g., executing the application program 116) may initiate sending of (e.g., may cause the computing device 102 to transmit) the one or more messages 130 to the server 104 to cause the server 104 to identify a first set of anonymization characteristics 153, to cause the server 104 to create a first cloud container 162, and to cause the server 104 to instantiate a first instance 152 of an access application 142 (e.g., an internet browser application) within the first cloud container 162 using the first set of anonymization characteristics 153. The processor-executable instructions 120 may be configured to, responsive to receiving the one or more messages 130 associated with the first browsing session, cause the one or more processors 122 to identify the first set of anonymization characteristics 153.

The processor-executable instructions 120 may be configured to, responsive to receiving the one or more messages 130 associated with the first browsing session, cause the one or more processors 122 to create the first cloud container 162 and to instantiate the first instance 152 of the access application 142 within the first cloud container 162 using the first set of anonymization characteristics 153. The first cloud container 162 is associated with the connection 129 such that access to the first cloud container 162 is restricted to client devices communicating with the server 104 via the connection 129 (e.g., access to the first cloud container 162 is restricted to the computing device 102). As described in more detail below, the server 104 may use the first instance 152 to access the first website 191 as a proxy server for the computing device 102.

The computing device 102 may, during the first browsing session, indicate a desire to browse a second website 193. For example, the one or more processors 114 executing the processor-executable instructions 112 may initiate sending of (e.g., may cause the computing device 102 to transmit) third data 136 to the server 104 to cause the server 104 to identify a second set of anonymization characteristics 155, to cause the server 104 to create a second cloud container 164, and to cause the server 104 to instantiate a second instance 154 of the access application 142 within the second cloud container 164 using the second set of anonymization characteristics 155. In some examples, the third data 136 corresponds to or includes a hypertext transfer protocol (HTTP) GET or POST request or another type of data request according to another data access protocol. The processor-executable instructions 120 may be configured to, responsive to receiving the third data 136, cause the one or more processors 122 to identify the second set of anonymization characteristics 155. The processor-executable instructions 120 may be configured to, responsive to receiving the third data 136, cause the one or more processors 122 to create the second cloud container 164 and to instantiate the second instance 154 of the access application 142 within the second cloud container 164 using the second set of anonymization characteristics 155. The second cloud container 164 is associated with the connection 129 such that access to the second cloud container 164 is restricted to client devices communicating with the server 104 via the connection 129 (e.g., access to the second cloud container 164 is restricted to the computing device 102). As described in more detail below, the server 104 may use the second instance 154 to access the second website 193 as a proxy server for the computing device 102.

The computing device 102 may, during the first browsing session, indicate a desire to browse a third website 195. For example, the one or more processors 114 executing the processor-executable instructions 112 may initiate sending of (e.g., may cause the computing device 102 to transmit) the sixth data 138 to the server 104 to cause the server 104 to identify a third set of anonymization characteristics 157, to cause the server 104 to create a third cloud container 166, and to cause the server 104 to instantiate a third instance 156 of the access application 142 within the third cloud container 166 using the third set of anonymization characteristics 157. In some examples, the sixth data 138 corresponds to or includes a HTTP GET or POST request or another type of data request according to another data access protocol. The processor-executable instructions 120 may be configured to, responsive to receiving the sixth data 138, cause the one or more processors 122 to identify the third set of anonymization characteristics 157. The processor-executable instructions 120 may additionally be configured to, responsive to receiving the sixth data 138, cause the one or more processors 122 to create the third cloud container 166 and to instantiate the third instance 156 of the access application 142 within the third cloud container 166 using the third set of anonymization characteristics 157. The third cloud container 166 is associated with the connection 129 such that access to the third cloud container 166 is restricted to client devices communicating with the server 104 via the connection 129 (e.g., access to the third cloud container 166 is restricted to the computing device 102). As described in more detail below, the server 104 may use the third instance 156 to access the third website 195 as a proxy server for the computing device 102.

The anonymization characteristics of each set of the first, second, and/or third sets of anonymization characteristics 153, 155, 157 may be any characteristics of the access application 142 that could serve as a "fingerprint" that could be used to identify the user or user patterns. To illustrate, when the access application 142 corresponds to an internet browser application, the first, second, and third sets of anonymization characteristics 153, 155, 157 may include browser attributes, such as browser plugins, system fonts, or both, that may serve as a "fingerprint" that could be used to identify the user or browsing patterns of the user. To prevent or limit the anonymization characteristics (e.g., the first, second, and/or third sets of anonymization characteristics 153, 155, 157) from serving as a "fingerprint" of a user or the computing device 102, the first, second, and/or third sets of anonymization characteristics 153, 155, 157 may be randomly or pseudo-randomly determined or selected (e.g., for each browsing session and/or for each website). For example, when the first, second, and/or third sets of anonymization characteristics 153, 155, 157 include system fonts, the processor-executable instructions 120 cause the one or more processors 122 to randomly or pseudo-randomly identify one or more first system fonts with which to instantiate the first instance 152 of the access application 142, randomly or pseudo-randomly identify one or more second system fonts with which to instantiate the second instance 154 of the access application 142, and randomly or pseudo-randomly identify one or more third system fonts with which to instantiate the third instance 156 of the access application 142.

Thus, in some examples, a new set of anonymization characteristics is determined or selected for each website, a new cloud container is created for each website, and a new instance of the access application is instantiated (within a new cloud container created for the website) using the anonymization characteristics identified for use with the website. Using a new cloud container including an instance of the browser application that is instantiated using randomly or pseudo-randomly selected anonymization characteristics (e.g., browser application attributes) for each website prevents or limits the ability to identify a user or user patterns based on browser application attributes.

Alternatively or additionally, the processor-executable instructions 120, when executed by the one or more processors 122, may cause the one or more processors 122 to identify a set of anonymization characteristics for each browsing session and to create a cloud container for each browsing session. In these examples, the processor-executable instructions 120, when executed by the one or more processors 122, cause the one or more processors 122 to, for each browsing session, instantiate an instance of an access application within the cloud container created for the browsing session using the anonymization characteristics identified for the browsing session.

To illustrate, to browse during a first browsing session, the one or more processors 114 executing the processor-executable instructions 112 may initiate sending of (e.g., may cause the computing device 102 to send) the one or more messages 130 associated with the first browsing session to the server 104. The computing device 102 may send the one or more messages 130 associated with the first browsing session to cause the server 104 to identify the first set of anonymization characteristics 153, to cause the server 104 to create the first cloud container 162, and to cause the server 104 to instantiate the first instance 152 of the access application 142 within the first cloud container 162 using the first set of anonymization characteristics 153. The processor-executable instructions 120 may be configured to, responsive to receiving the one or more messages 130 associated with the first browsing session, cause the one or more processors 122 to identify the first set of anonymization characteristics 153. The processor-executable instructions 120 may additionally be configured to, responsive to receiving the one or more messages 130 associated with the first browsing session, cause the one or more processors 122 to create the first cloud container 162 and to instantiate the first instance 152 of the access application 142 within the first cloud container 162 using the first set of anonymization characteristics 153. As described in more detail below, the server 104 may use the first instance 152 instantiated within the first cloud container 162 to access, as a proxy server for the computing device 102, one or more websites during the first browsing session.

As another example, to browse during a second browsing session, the one or more processors 114 executing the processor-executable instructions 112 may initiate sending of (e.g., may cause the computing device 102 to transmit) the one or more messages 130 associated with the second browsing session to the server 104. The computing device 102 may send the one or more messages 130 associated with the second browsing session to cause the server 104 to identify the second set of anonymization characteristics 155, to cause the server 104 to create the second cloud container 164, and to cause the server 104 to instantiate the second instance 154 of the access application 142 within the second cloud container 164 using the second set of anonymization characteristics 155. The processor-executable instructions 120 may be configured to, responsive to receiving the one or more messages 130 associated with the second browsing session, cause the one or more processors 122 to identify the second set of anonymization characteristics 155. The processor-executable instructions 120 may additionally be configured to, responsive to receiving the one or more messages 130 associated with the second browsing session, cause the one or more processors 122 to create the second cloud container 164 and to instantiate the second instance 154 of the access application 142 within the second cloud container 164 using the second set of anonymization characteristics 155. As described in more detail below, the server 104 may use the second instance 154 instantiated within the second cloud container 164 to access, as a proxy server for the computing device 102, one or more websites during the second browsing session.

As another example, to browse during a third browsing session, the one or more processors 114 executing the processor-executable instructions 112 may initiate sending of (e.g., may cause the computing device 102 to transmit) the one or more messages 130 associated with the third browsing session to the server 104. The computing device 102 may send the one or more messages 130 associated with the third browsing session to cause the server 104 to identify the third set of anonymization characteristics 157, to cause the server 104 to create the third cloud container 166, and to cause the server 104 to instantiate the third instance 156 of the access application 142 within the third cloud container 166 using the third set of anonymization characteristics 157. The processor-executable instructions 120 may be configured to, responsive to receiving the one or more messages 130 associated with the third browsing session, cause the one or more processors 122 to identify the third set of anonymization characteristics 157. The processor-executable instructions 120 may additionally be configured to, responsive to receiving the one or more messages 130 associated with the third browsing session, cause the one or more processors 122 to create the third cloud container 166 and to instantiate the third instance 156 of the access application 142 within the third cloud container 166 using the third set of anonymization characteristics 157. As described in more detail below, the server 104 may use the third instance 156 instantiated within the third cloud container 166 to access, as a proxy server for the computing device 102, one or more websites during the third browsing session.

Thus, in some examples, a new set of anonymization characteristics is identified for each new browsing session and a new instance of the access application is instantiated within a cloud container created for the browsing session. Using a new cloud container including an instance of the access application 142 that is instantiated using randomly or pseudo-randomly selected anonymization characteristics (e.g., browser application attributes) for each browsing session prevents or limits the ability to identify a user or user patterns based on browser application attributes.

The processor-executable instructions 120, when executed by the one or more processors 122, may cause the one or more processors 122 to assign a communication address to a cloud container when the cloud container is created. For example, the one or more processors 122 may be configured to assign a communication address 163 to the first cloud container 162 when the first cloud container 162 is created, to assign a communication address 165 to the second cloud container 164 when the second cloud container 164 is created, and to assign a communication address 167 to the third cloud container 166 when the third cloud container 166 is created. The communication address is associated with the public cloud 199. In some examples, the communication address corresponds to an internet protocol (IP) address within a pool of IP addresses (e.g., an IP address within an IP range) associated with the public cloud 199. In some examples, the IP addresses assigned to the cloud containers are randomly selected from available IP addresses within the pool of IP addresses associated with the public cloud 199. Thus, in examples in which a new cloud container is created for each browsing session, each browsing session is conducted using a randomly or pseudo-randomly assigned IP address that may be used by other users (e.g., when not in use by an existing cloud container). Additionally, in examples in which a new cloud container is used for each website, each website is accessed using a randomly or pseudo-randomly assigned IP address that may be used by other computing devices when not in use by the computing device 102. Using a new cloud container including a randomly or pseudo-randomly selected IP address for each browsing session and/or for each website prevents or limits the ability to identify a user or user patterns based on IP address.

In examples in which a single cloud container is created per browsing session, each cloud container (and the associated instance of the access application) is destroyed upon termination of the respective browsing session. For example, a browsing session may be terminated when the application program 116 is closed, when the connection 129 associated with the browsing session is terminated, when the computing device 102 closes any open access application windows, when a period of inactivity at the computing device 102 satisfies a timeout threshold, when the computing device 102 enters a power saving mode, or when the computing device 102 is powered off. In examples in which a new cloud container is created for each website, each cloud container (and the associated instance of the access application) is destroyed when association between the computing device 102 and the respective website is terminated. For example, association with a particular website may be terminated when all open access application windows associated with the particular website on the computing device 102 are closed, when the computing device 102 navigates away from the particular website, when the application program 116 is closed, when a period of inactivity at the computing device 102 satisfies a timeout threshold, when the computing device 102 enters a power saving mode, or when the computing device 102 is powered off.

The processor-executable instructions 120, when executed by the one or more processors 122, cause the one or more processors 122 to retrieve data (e.g., first data 171, fourth data 177, and/or seventh data 183) from one or more of the websites 191, 193, 195 using one or more instances of the access application 142. For example, in response to data or messages from the computing device 102 to browse one or more of the websites 191, 193, 195, the server 104 may send one or more requests for data to one or more servers of each of the websites 191, 193, and 195 to access the one or more websites 191, 193, 195 as a proxy server for the computing device 102. In response to the request for data from the server 104, one or more servers of each of the websites 191, 193, and 195 may send data (e.g., HTML data) enabling the server 104 to render the websites 191, 193, and 195.

In some examples, a different instance of the access application 142 is used to access (e.g., retrieve data from) each different website (e.g., even within a single browsing session by a single user). To illustrate, during a single browsing session, a user may navigate to the first website 191, to the second website 193, and to the third website 195. In this example, the data 171, 177, 183 is retrieved from the websites 191, 193, 195 respectively, using different instances of the access application 142 instantiated within different cloud containers. For example, the one or more processors 122 may retrieve the first data 171 from the first website 191 using the first instance 152 of the access application 142 within the first cloud container 162, may retrieve the fourth data 177 from the second website 193 using the second instance 154 of the access application 142 within the second cloud container 164, and may retrieve the seventh data 183 from the third website 195 using the third instance 156 of the access application 142 within the third cloud container 166.

To illustrate, the first instance 152 of the access application 142 may cause the server 104 to send a request for data to render the first website 191 to one or more servers that host the first website 191. In response to the request from the first instance 152, the one or more servers that host the first website 191 may send the first data 171 (e.g., HTML data or other data) enabling the server 104 to render the first website 191. As another example, the second instance 154 of the access application 142 may cause the server 104 to send a request for data to render the second website 193 to one or more servers that host the second website 193. In response to the request from the second instance 154, the one or more servers that host the second website 193 may send the fourth data 177 (e.g., HTML data or other data) enabling the server 104 to render the second website 193. As another example, the third instance 156 of the access application 142 may cause the server 104 to send a request for data to render the third website 195 to one or more servers that host the third website 195. In response to the request from the third instance 156, the one or more servers that host the third website 195 may send the seventh data 183 (e.g., HTML data or other data) enabling the server 104 to render the third website 195.

Thus, the one or more processors 122 may use a different instance of the access application 142 to access each different website navigated to by a user (e.g., during a single browsing session). Using a new cloud container including an instance of the browser application that is instantiated using randomly or pseudo-randomly selected anonymization characteristics (e.g., browser application attributes) and a randomly or pseudo-randomly assigned IP address for each website prevents or limits the ability to identify a user or user patterns.

Although FIG. 1 illustrates using a different instance of the access application 142 (within a different cloud container) to retrieve data from each website, in other examples, a single instance of the access application 142 may be used to retrieve data from multiple websites during a single browsing session. For example, the first instance 152 of the access application 142 within the first cloud container 162 may be used to retrieve the first data 171 from the first website 191 and the fourth data 177 from the second web site 193 during the first browsing session. In this example, the second instance 154 or the third instance 156 of the access application 142 within the second cloud container 164 or the third cloud container 166 may be used to retrieve the seventh data 183 from the third website 195 during the second browsing session.

Thus, the one or more processors 122 may use a different instance of the access application 142 to access (e.g., to retrieve data from) one or more websites for each different browsing session. Using a new cloud container including an instance of the browser application that is instantiated using randomly or pseudo-randomly selected anonymization characteristics (e.g., browser application attributes) and a randomly or pseudo-randomly assigned IP address for each browsing session prevents or limits the ability to identify the computing device or browsing patterns of the computing device.

The processor-executable instructions 120, when executed by the one or more processors 122, cause the one or more processors 122 to initiate sending data to the computing device 102 via the connection 129. The data sent to the computing device 102 is determined based on the data retrieved from a respective website. For example, the one or more processors 122 may send the computing device 102 second data 141 that is based on the first data 171 when the user is browsing the first website 191, may send the computing device 102 fifth data 143 based on the fourth data 177 when the user is browsing the second website 193, and may send the computing device 102 eighth data 145 based on the seventh data 183 when the user is browsing the third website 195.

The data sent to the computing device 102 (e.g., the second data 141) may correspond to data to render an internet browser application interface. For example, the first instance 152 of the access application 142 may receive data (e.g., the first data 171) to render the first website 191. In response to receiving the first data 171, the server 104 may at least partially render the first website 191. The server 104 may remotely share the browser application interface of the first website 191 (as at least partially rendered by the server 104) with the computing device 102 by sending the computing device the second data 141. In some examples, the second data 141, the fifth data 143, and the eighth data 145 may be sent using a remote desktop protocol, such as Apple Remote Desktop™ protocol or X Window System™ protocol.

Figure 2:
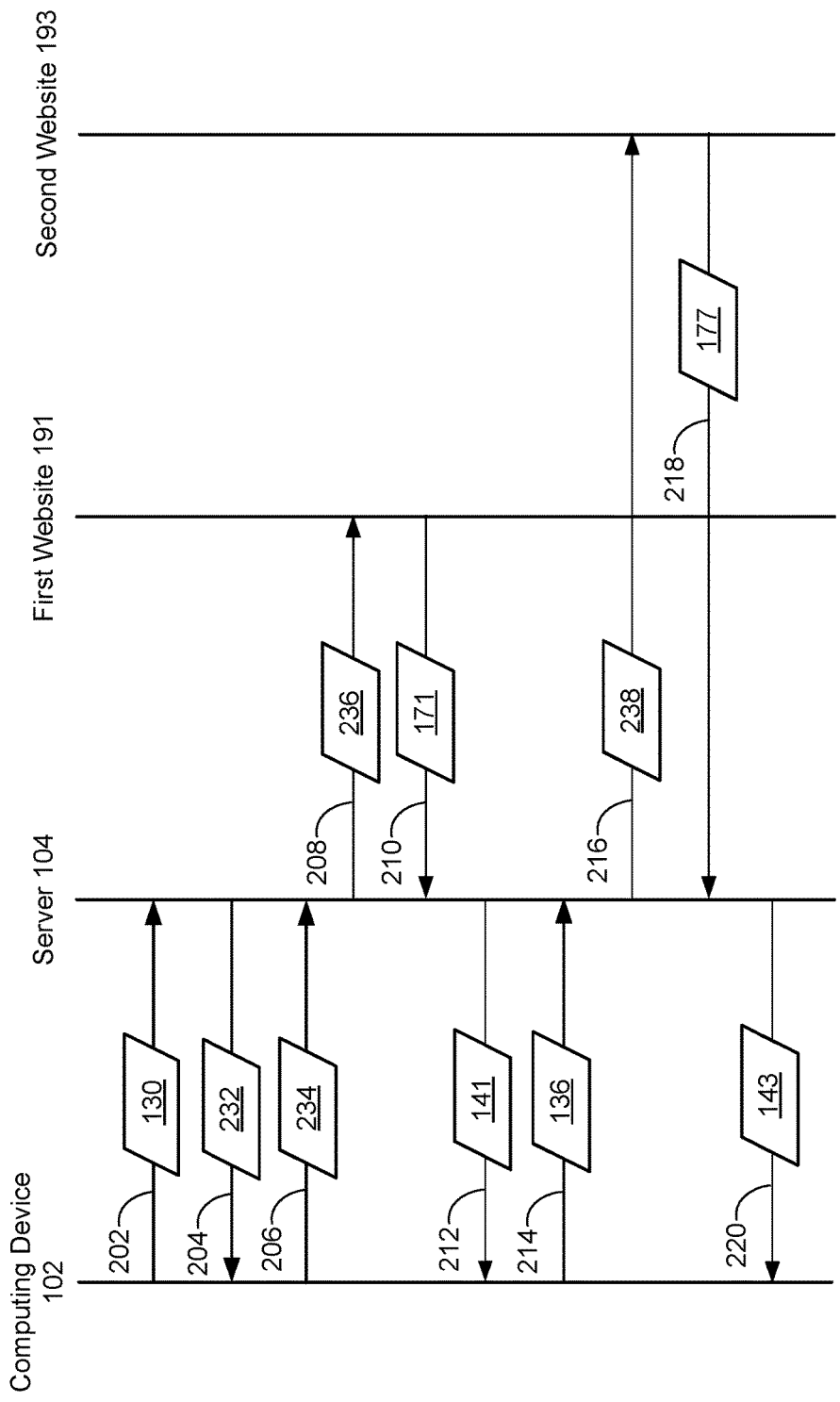
FIG. 2 is a diagram illustrating an example of communications between the computing device and the server of FIG. 1 and communications between the server of FIG. 1 and websites during a single browsing session.

FIG. 2 is a diagram illustrating an example of communications between the computing device 102 and the server 104 and communications between the server 104 and the websites 191 and 193 during a single browsing session.

In the example illustrated in FIG. 2, during initiation of a browsing session (e.g., the first browsing session described above with reference to FIG. 1), the computing device 102 transmits, at 202, the one or more messages 130. The one or more messages 130 may include a request to establish a connection with the server 104. For example, the one or more processors 114 may execute the processor-executable instructions 112 including the application program 116 to cause the computing device 102 to transmit the one or more messages 130 including the request to establish a connection with the server 104. The connection between the computing device 102 and the server 104 that is established in response to the one or more messages 130 may correspond to the connection 129 of FIG. 1 and may be a secure connection. In some examples, the one or more messages 130 are triggered by activation of the application program 116 of FIG. 1. For example, a user may provide input at the computing device 102 indicating that the user desires to activate the application program 116 and to initiate the first browsing session using the application program 116.

Although the one or more messages 130 are described as including a request to establish the connection 129, in other examples, the connection 129 may be established when the browsing session is initiated. For example, the connection 129 may have been previously established during initiation of a previous browsing session by the computing device 102 using the application program 116. In this example, the previous browsing session may have been terminated without terminating the connection 129 used during the previous browsing session. In this example, the connection 129 used during the previous browsing session may remain established when the browsing session of FIG. 2 is initiated. In this example, the one or more messages 130 of FIG. 2 may not include a request to establish the connection 129 and the browsing session of FIG. 2 may use the already existing connection 129 that was established for the preceding browsing session.

In response to the one or more messages 130, the server 104 may identify a first set of anonymization characteristics (e.g., first browser attributes) as described above with reference to the first set of anonymization characteristics 153 of FIG. 1. Additionally, in response to the one or more messages 130, the server 104 may instantiate, within a new cloud container, a first instance of an access application having the first set of anonymization characteristics as described above with reference to the first instance 152 of the access application 142 and the first cloud container 162 of FIG. 1. The server 104 may randomly or pseudo-randomly assign the first cloud container 162 an IP address as described above with reference to the first IP address 163 of FIG. 1. Thus, the server 104 may create a cloud container having a randomly or pseudo-randomly assigned IP address and including an instance of an access application that is instantiated with randomly or pseudo-randomly identified browser attributes.

In the example illustrated in FIG. 2, the server 104 transmits, at 204, one or more messages 232 to establish the connection (e.g., the connection 129), thereby enabling the computing device 102 to securely communicate with the server 104. Although the example illustrated in FIG. 2 includes the server 104 transmitting the one or more messages 232 to establish the connection 129, as described above, the connection 129 may be an existing connection that was established between the computing device 102 and the server 104 during a previous browsing session of the computing device 102. In these examples, the server 104 may not transmit the one or more messages 232 in response to the one or more messages 130 associated with the browsing session of FIG. 2.

In the example illustrated in FIG. 2, the computing device 102 transmits, at 206, a request 234 to navigate to a first website, such as the first website 191 of FIG. 1. For example, the one or more processors 114 may execute the processor-executable instructions 112 including the application program 116 to cause the computing device 102 to transmit the request 234 to navigate to the first website 191. In some examples, the request 234 to navigate to the first website 191 corresponds to or includes an HTTP GET or POST or other data request according to another data access protocol other than the HTTP. In some examples, the request 234 to navigate to the first website is transmitted over the established connection (e.g., the connection 129) between the computing device 102 and the server 104. Alternatively, the request to navigate to the first website may be included in the one or more messages 130. In these examples, the computing device 102 may not transmit the request 234 separately or independently from the one or more messages 130.

In the example illustrated in FIG. 2, at 208 the server 104 transmits, to one or more servers that host the first website 191, a request 236 for data to render the first website 191. The request 236 for data to render the first website 191 is generated and sent using the first instance 152 of the access application 142. The request 236 may correspond to or include a GET or POST request or other data access request using another data access protocol. In some examples, the request 236 is based on the request 234. For example, to generate the request 236, the server 104 may strip headers of the request 234 and repackage the request 234 with headers based on the first set of anonymization characteristics 153. Thus, the request 236 received by the one or more servers of the first website 191 is transmitted based on an instance of a browser application that includes randomly or pseudo-randomly identified browser attributes and using a randomly or pseudo-randomly assigned IP address.

In the example illustrated in FIG. 2, in response to the request from the first instance 152, the one or more servers that host the first website 191 transmit, at 210, data (e.g., the first data 171, such as HTML data) enabling the server 104 to render the first website 191. The server 104 at least partially renders the first website 191 (or otherwise converts the first data 171 to graphical output data) based on the first data 171 from the first web site 191.

In the example illustrated in FIG. 2, at 212 the server 104 transmits data (e.g., the second data 141) to the computing device 102 based on the first data 171 retrieved from the first website 191. The data sent to the computing device 102 (e.g., the second data 141) may correspond to data to render an internet browser application interface. For example, the first instance 152 of the access application 142 may receive data to render the first website 191, may render the first website 191, and may remotely share the browser application interface of the first website 191 with the computing device 102 by sending the second data 141 to the computing device 102. In some examples, the second data 141 is transmitted to the computing device 102 using a remote desktop protocol, such as Apple Remote Desktop™ protocol or X Window System™ protocol. Thus, the user of the computing device 102 accesses a rendered or partially rendered version of the first website 191 without communicating directly with the first website 191, thereby preventing or limiting an ability of the first website 191 to identify the computing device 102 based on browser attributes or IP address of the computing device 102.

In the example illustrated in FIG. 2, the computing device 102 transmits, at 214, the third data 136 requesting to browse another website, such as the second website 193. For example, the one or more processors 114 may execute the processor-executable instructions 112 including the application program 116 to cause the computing device 102 to transmit the third data 136 to request to browse the second website 193. In some examples, the third data 136 corresponds to or includes a hypertext transfer protocol (HTTP) GET or POST request or another type of data request according to another data access protocol. In some examples, the third data 136 to navigate to the second website 193 is transmitted to the server 104 via the established connection (e.g., the connection 129) between the computing device 102 and the server 104.

In response to receiving the third data 136 to navigate to the second website 193, the server 104 may identify a second set of anonymization characteristics as described above with reference to the second set of anonymization characteristics 155 of FIG. 1 and may instantiate, within a different cloud container (e.g., a second cloud container) than the cloud container containing the first instance of the access application, a second instance of the access application having the second anonymization characteristics as described above with reference to the second cloud container 164 and the second instance 154 of FIG. 1. The server 104 may randomly or pseudo-randomly assign the second cloud container 164 a second IP address as described above with reference to the second IP address 165 of FIG. 1. The second set of anonymization characteristics 155 may be different than the first set of anonymization characteristics 153 and the second IP address 165 may be different than the first IP address 163. Thus, to access the second website 193, the server 104 may create a separate cloud container (e.g., the second cloud container 164) than the first cloud container 162 used to access the first website 191, and the separate cloud container is randomly or pseudo-randomly assigned an IP address and includes a second instance of an access application that is instantiated with randomly or pseudo-randomly identified anonymization characteristics.

In the example illustrated in FIG. 2, at 216 the server 104 transmits to one or more servers that host the second website 193 a request 238 for data to render the second website 193. The request 238 for data to render the second website 193 is generated and sent using the second instance 154 of the access application 142. The request 238 may correspond to or include a GET or POST request or other data access request using another data access protocol. In some examples, the request 238 is based on the third data 136. For example, to generate the request 238, the server 104 may strip headers of the third data 136 and repackage the third data 136 with headers based on the second set of anonymization characteristics 155. Thus, the request 238 received by the one or more servers of the second website 193 is transmitted based on an instance of a browser application that includes randomly or pseudo-randomly identified browser attributes and using a randomly or pseudo-randomly assigned IP address.

Because the IP addresses of the first and second cloud containers and the browser attributes of the first and second instances of the browser application are randomly or pseudo-randomly identified and/or assigned, the IP address and browser attributes used to access the first website 191 may be different than the IP address and browser attributes used to access the second website 193. In these examples, the second website 193 is unable to correlate the user that accessed the first website 191 with the user that accessed the second website 193 based on IP address or browser attributes. Additionally, because the IP address may be assigned to any user that uses the application program 116 and the server 104, the IP address may be assigned to different users at different times, further obscuring identification of a user based on IP address.

In the example illustrated in FIG. 2, in response to the request 238, the one or more servers that host the second website 193 transmit, at 218, data (e.g., the fourth data 177, such as HTML data) enabling the server 104 to render the second website 193. The server 104 at least partially renders the second website 193 (or otherwise converts the fourth data 177 to graphical output data) based on the fourth data 177 from the second website 193.

In the example illustrated in FIG. 2, at 220 the server 104 transmits data (e.g., such as the fifth data 143) to the computing device 102 based on the data retrieved from the second website 193. The data sent to the computing device 102 (e.g., the fifth data 143) may correspond to data to render an internet browser application interface. For example, the second instance 154 of the access application 142 may receive data to render the second website 193, may render the second website 193, and may remotely share the browser application interface of the second website 193 with the computing device 102 by sending the fifth data 143 to the computing device. In some examples, the fifth data 143 is transmitted to the computing device 102 using a remote desktop protocol, such as Apple Remote Desktop™ protocol or X Window System™ protocol. Thus, the user of the computing device 102 accesses a rendered or partially rendered version of the first website 191 without communicating directly with the second website 193, thereby preventing or limiting an ability of the second website 193 to identify the computing device 102 based on browser attributes or IP address of the computing device 102.

Figure 3:
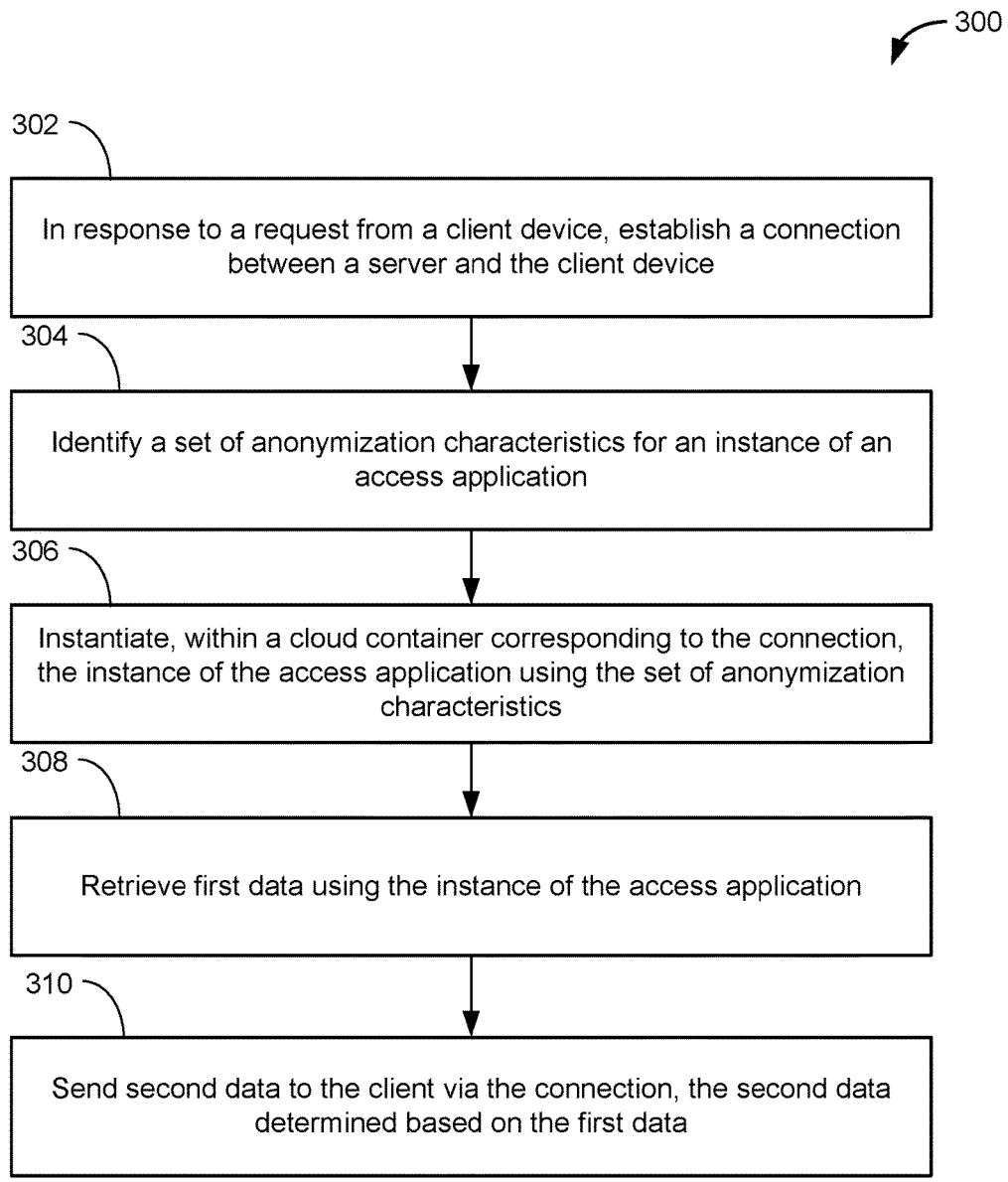
FIG. 3 illustrates a flowchart of a method for providing browsing data to a computing device.

FIG. 3 illustrates a method for providing browsing data to a computing device. The method may be performed by the server 104 of FIG. 1.

The method 300 includes, at 302, in response to a request from a computing device, establishing a connection between a server and the computing device. The server may correspond to the server 104 of FIG. 1, and the computing device may correspond to the computing device 102 of FIG. 1. The request may correspond to the request of the one or more messages 130 described above with reference to FIG. 1. For example, the request may be sent by the computing device during initiation of a first browsing session. The connection may be used to transfer browsing-related data between the server and the computing device during the first browsing session. As an example, the connection may correspond to the connection 129 associated with the first browsing session described above with reference to FIG. 1. To illustrate, the connection may correspond to a VPN connection between the computing device 102 and the server 104 and may be established as described above with reference to FIG. 1.

The method 300 includes, at 304, identifying a first set of anonymization characteristics for a first instance of an access application, such as the access application 142 described above with reference to FIG. 1. The first set of anonymization characteristics may correspond to the first set of anonymization characteristics 153 described above with reference to FIG. 1. The first set of anonymization characteristics may be randomly or pseudo-randomly identified. The first set of anonymization characteristics is identified before the first instance of the access application is instantiated. For example, as described above, the first instance of the access application may be instantiated, and the first set of anonymization characteristics may be identified, responsive to the one or more messages 130 of FIGS. 1 and 2.

The method 300 includes, at 306, instantiating within a first cloud container corresponding to the connection (associated with the first browsing session), the first instance of the access application using the first set of anonymization characteristics. For example, the first instance of the access application may correspond to the first instance 152 of the access application 142 described above with reference to FIG. 1. As described above, the first instance 152 of the access application 142 may be instantiated within the first cloud container 162. The first set of anonymization characteristics may be identified, and the first instance of the access application may be instantiated, to browse or access a first website (e.g., during the first browsing session).

In some examples, the method 300 additionally includes assigning a communication address to the first cloud container. For example, the communication address may correspond to the communication address 163 described above with reference to FIG. 1. The communication address is associated with a public cloud, such as the public cloud 199 of FIG. 1. In some examples, the communication address corresponds to an IP address in an IP address range associated with the public cloud.

The method 300 includes, at 308, retrieving first data using the first instance of the access application. The first data may be retrieved from a first website, such as the first website 191 of FIG. 1. For example, the first instance 152 of the access application 142 may cause the server 104 to send a request for data to render the first website 191 to one or more servers that host the first website 191. The server 104 may send the request for data to the one or more servers that host the first website 191 responsive to a request from the computing device 102 to browse the first website 191. For example, the request for data to render the first website 191 may correspond to the request 236 of FIG. 2, which may be based on the request 234 of FIG. 2 from the computing device as described above with reference to FIG. 2. Thus, the server 104 may access the (one or more servers that host the) first website 191 as a proxy server for the computing device 102. In response to the request from the first instance 152, the one or more servers that host the first web site 191 may send data (e.g., the first data 171) enabling the server 104 to render the first website 191 (or otherwise convert the first data 171 to graphical output data).

The method 300 includes, at 310, sending second data to the computing device via the connection. The second data is determined based on the first data. For example, the second data may correspond to the second data 141 that is based on the first data 171 as described above with reference to FIG. 1. The second data sent to the computing device 102 (e.g., the second data) may correspond to data to render an internet browser application interface. For example, the first instance 152 of the access application 142 may receive data to render the first web site 191, may render the first website 191, and may remotely share the browser application interface of the first website 191 with the computing device 102 by sending the computing device the second data 141. In some examples, the second data 141 may be sent using a remote desktop protocol, such as Apple Remote Desktop™ protocol or X Window System™ protocol.

Thus, the computing device 102 may receive during a browsing session, via a connection between the server 104 and the computing device 102, data enabling the computing device 102 to render at least a portion of the first website 191 without the computing device 102 communicating directly with the first website 191. For example, the server 104 may act as an anonymizing proxy server for the computing device 102. Additionally, the browser attributes (of the first instance of the access application) and the IP address (of the first cloud container) used to access the first website 191 may be anonymously or pseudo-anonymously assigned, preventing or limiting the ability of the first website to identify the computing device 102 or browsing patterns associated with the computing device 102.

In some examples, the method 300 additionally includes destroying the first cloud container 162 (e.g., the first instance 152). For example, the first cloud container 162 may be destroyed upon termination of the respective browsing session or is destroyed when association between the computing device 102 and the respective website (e.g., the first web site 191) is terminated as described above.

In some examples, the method 300 additionally includes identifying a second set of anonymization characteristics for a second instance of the access application 142. The second set of anonymization characteristics may be identified in response to receiving data (e.g., the third data 136 of FIGS. 1 and 2) from the computing device 102 indicating that the computing device 102 desires to navigate to a second website (e.g., the second website 193 of FIG. 1) during the first browsing session. The second set of anonymization characteristics may correspond to the second set of anonymization characteristics 155 described above with reference to FIG. 1.

In these examples, the method 300 includes instantiating within a second cloud container, the second instance of the access application using the second set of anonymization characteristics. For example, the second instance of the access application may correspond to the second instance 154 of the access application 142 described above with reference to FIG. 1 and the second cloud container may correspond to the second cloud container 164. The second set of anonymization characteristics may be identified, and the second instance of the access application may be instantiated, to browse or access a second website during the first browsing session.

In these examples, the method 300 additionally includes retrieving data using the second instance 154 of the access application 142. The data may be retrieved from a second website, such as the second website 193 of FIG. 1, and may correspond to the fourth data 177 described above with reference to FIG. 1. For example, the second instance 154 of the access application 142 may cause the server 104 to send a request for data to render the second website 193 to one or more servers that host the second website 193. In response to the request from the second instance 154, the one or more servers that host the second website 193 may send data (e.g., the fourth data 177) enabling the server 104 to render the second website 193. In these examples, the method 300 additionally includes sending data to the computing device 102 via the connection 129. The data sent to the computing device 102 is determined based on the data retrieved from the second website 193. For example, the data sent to the computing device 102 may correspond to the fifth data 143 that is based on the fourth data 177 as described above with reference to FIGS. 1 and 2. The data (e.g., the fifth data 143) sent to the computing device 102 may correspond to data to render an internet browser application interface. For example, the second instance 154 of the access application 142 may receive the fourth data 177 to render the second website 193, may render the second website 193, and may remotely share the browser application interface of the second website 193 with the computing device 102 by sending the computing device the fifth data 143.

Thus, the server 104 may use a different instance of the access application 142 (that is instantiated with randomly or pseudo-randomly identified anonymization characteristics within a different cloud container using a randomly or pseudo-randomly assigned an IP address) to access (e.g., to retrieve data from) each different website navigated to during a browsing session. Using a new cloud container including an instance of the browser application that is instantiated using randomly or pseudo-randomly selected anonymization characteristics (e.g., browser application attributes) and a randomly or pseudo-randomly assigned IP address for each website prevents or limits the ability to identify a user or user patterns.

In some examples, the method 300 additionally includes, in response to one or more messages (including a second request) associated with a second browsing session, establishing a connection (associated with the second browsing session) between a server and the computing device. The second connection may be established as described above with reference to the connection 129 associated with the first browsing session that precedes the second browsing session. In these examples, the method 300 includes identifying a second set of anonymization characteristics for a second instance of the access application. For example, the second set of anonymization characteristics may correspond to the second set of anonymization characteristics 155 described above with reference to FIG. 1.

In these examples, the method 300 includes instantiating within a second cloud container corresponding to the connection associated with the second browsing session, the instance of the access application using the second set of anonymization characteristics. For example, the second instance of the access application may correspond to the second instance 154 of the access application 142 described above with reference to FIG. 1 and the second cloud container may correspond to the second cloud container 164. In these examples, the method 300 additionally includes retrieving data using the second instance of the access application. The data may be retrieved from a second website, such as the second website 193 of FIG. 1, and may correspond to the fourth data 177 described above with reference to FIG. 1. For example, the second instance 154 of the access application 142 may cause the server 104 to send a request for data to render the second website 193 to one or more servers that host the second website 193. In response to the request from the second instance 154, the one or more servers that host the second website 193 may send data (e.g., the fourth data 177) enabling the server 104 to render the second website 193. In these examples, the method 300 additionally includes sending data to the computing device via the connection. The data sent to the computing device is determined based on the data retrieved from the second website 193. For example, the data may correspond to the fifth data 143 that is based on the fourth data 177 as described above with reference to FIG. 1. The data sent to the computing device 102 may correspond to data to render an internet browser application interface. For example, the second instance 154 of the access application 142 may receive the fourth data 177 to render the second website 193, may render the second website 193, and may remotely share the browser application interface of the second website 193 with the computing device 102 by sending the fifth data 143 to the computing device 102.

Thus, the one or more processors 122 may use a different instance of the access application 142 (that is instantiated with randomly or pseudo-randomly identified anonymization characteristics within a different cloud container using a randomly or pseudo-randomly assigned IP address) to access (e.g., to retrieve data from) one or more websites for each different browsing session of a user. Using a new cloud container including an instance of the browser application that is instantiated using randomly or pseudo-randomly selected anonymization characteristics (e.g., browser application attributes) and a randomly or pseudo-randomly assigned IP address for each browsing session prevents or limits the ability to identify a user or user patterns.

Figure 4:
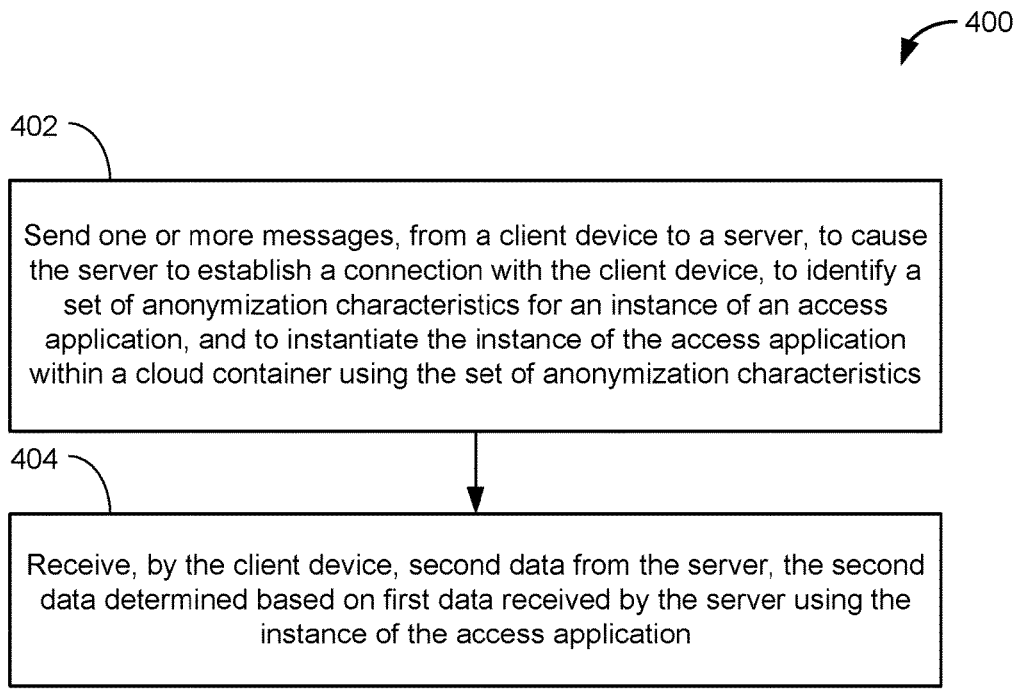
FIG. 4 illustrates a flowchart of a method for anonymous web browsing.

FIG. 4 illustrates a method 400 for anonymously browsing the internet using a cloud server as a proxy. The method 400 may be performed by the computing device 102 of FIG. 1.

The method 400 includes, at 402, sending one or more messages, from a computing device to a server to cause the server to establish a connection with the computing device for use during a first browsing session, to cause the server to identify a first set of anonymization characteristics for a first instance of an access application, and to cause the server to instantiate the first instance of the access application within a first cloud container using the first set of anonymization characteristics. The server may correspond to the server 104 of FIG. 1 and the computing device may correspond to the computing device 102 of FIG. 1 (or any component thereof, such as the one or more processors 114. The one or more messages may correspond to the one or more messages 130 described above with reference to FIG. 1. The one or more messages 130 may be sent during initiation of a browsing session.

The one or more messages 130 may include a request to establish a connection between the server and the computing device. The connection may be used to transfer browsing-related data between the server and the computing device. As an example, the connection may correspond to the connection 129 associated with the first browsing session as described above with reference to FIG. 1. To illustrate, the connection may correspond to a VPN connection between the computing device 102 and the server 104 and may be established as described above with reference to FIG. 1.

The one or more messages 130 may include one or more messages that trigger the server 104 to identify the first set of anonymization characteristics. As described above with reference to FIG. 1, the first set of anonymization characteristics identified for an instance of an access application is used to instantiate the first instance of the access application. For example, the first set of anonymization characteristics may correspond to the first set of anonymization characteristics 153 described above with reference to FIG. 1. The first set of anonymization characteristics may be randomly or pseudo-randomly identified.

The one or more messages 130 associated with the first browsing session may trigger the server to instantiate, within the first cloud container corresponding to the connection associated with the first browsing session, the first instance of the access application using the first set of anonymization characteristics. For example, the first instance of the access application may correspond to the first instance 152 of the access application 142 described above with reference to FIG. 1. As described above, the first instance 152 of the access application 142 may be instantiated within the first cloud container 162.

In some examples, the one or more messages 130 associated with the first browsing session may trigger the server to assign a communication address to the first cloud container. For example, the communication address may correspond to the communication address 163 described above with reference to FIG. 1. The communication address is associated with a public cloud, such as the public cloud 199 of FIG. 1. In some examples, the communication address corresponds to an IP address within an IP address range associated with the public cloud.

The method 400 includes, at 404, receiving second data from the server 104 (e.g., via the connection 129 associated with the first browsing session). The second data is determined based on first data retrieved by the server from a first website (e.g., the first website 191 of FIG. 1) using the first instance of the access application. For example, the second data may correspond to the second data 141 that is based on the first data 171 as described above with reference to FIGS. 1 and 2. The server 104 may access the first website 191 (e.g., may retrieve the first data 171) responsive to a request from the computing device 102 to browse the first website 191. For example, the server 104 may send a request (e.g., the request 236 of FIG. 2) to the first website 191 to retrieve the first data 171 responsive to a request (e.g., the request 234 of FIG. 2) from the computing device 102 to browse the first website 191. Thus, the server 104 may access (e.g., retrieve data from) the (one or more servers that host the) first website 191 as a proxy server for the computing device 102. The second data sent to the computing device 102 (e.g., the second data 141) may correspond to data to render an internet browser application interface. For example, the first instance 152 of the access application 142 may receive data to render the first web site 191, may render the first website 191, and may remotely share the browser application interface of the first website 191 with the computing device 102 by sending the second data 141 to the computing device 102. In some examples, the second data 141 may be sent using a remote desktop protocol, such as Apple Remote Desktop™ protocol or X Window System™ protocol.

Thus, the computing device 102 may retrieve data enabling the computing device 102 to render at least a portion of the first website 191 without communicating directly with the website. Additionally, the browser attributes and the IP address used to access the first website may be randomly or pseudo-anonymously assigned, preventing or limiting the ability of the first website to identify the computing device 102 or browsing patterns associated with the computing device 102.

In some examples, the method 400 additionally includes sending, during the first browsing session, data from the computing device 102 to the server 104. The data includes a request to navigate to the second website 193. For example, the computing device 102 may send the third data 136 described above with reference to FIGS. 1 and 2. The computing device 102 sends the third data 136 to cause the server 104 to identify a second set of anonymization characteristics for a second instance of an access application. The second set of anonymization characteristics may correspond to the second set of the sets of anonymization characteristics 155 described above with reference to FIG. 1. The third data 136 may additionally cause the server to instantiate, within a second cloud container, a second instance of the access application using the second set of anonymization characteristics. For example, the second instance of the access application may correspond to the second instance 154 of the access application 142 described above with reference to FIG. 1, and the second cloud container may correspond to the second cloud container 164.

In these examples, the third data 136 causes the server 104 to retrieve data from the second website 193 using the second instance 154 of the access application 142. The data retrieved from the second website 193 may correspond to the fourth data 177 described above with reference to FIGS. 1 and 2. For example, the second instance 154 of the access application 142 may cause the server 104 to send a request (e.g., the request 238 of FIG. 2) for data to render the second website 193 to one or more servers that host the second website 193. In response to the request from the second instance 154, the one or more servers that host the second website 193 may send data (e.g., the fourth data 177) enabling the server 104 to render the second website 193. In these examples, the method 400 additionally includes receiving data from the server via the connection. The data received by the computing device from the server is determined based on the data retrieved from the second website 193. For example, the data may correspond to the fifth data 143 that is based on the fourth data 177 as described above with reference to FIG. 1. The data received by the computing device 102 may correspond to data to render an internet browser application interface. For example, the second instance 154 of the access application 142 may receive the fourth data 177 to render the second website 193, may render the second website 193, and may remotely share the browser application interface of the second website 193 with the computing device 102 by sending the computing device the fifth data 143.

Thus, the computing device 102 may be configured to cause a server to use a different instance of the access application 142 (that is instantiated with randomly or pseudo-randomly identified anonymization characteristics within a different cloud container using a randomly or pseudo-randomly assigned an IP address) to access (e.g., to retrieve data from) each different website navigated to by a user (e.g., during a single browsing session). Using a new cloud container including an instance of the browser application that is instantiated using randomly or pseudo-randomly selected anonymization characteristics (e.g., browser application attributes) and a randomly or pseudo-randomly assigned IP address for each website prevents or limits the ability to identify a user or user patterns.

In some examples, the method 400 additionally includes sending one or more messages associated with a second browsing session subsequent to termination of the connection 129 associated with the first browsing session. The one or more messages associated with the second browsing session are configured to cause the server 104 to establish a connection (associated with the second browsing session) between the server 104 and the computing device 102. The connection associated with the second browsing session may be established as described above with reference to the connection 129. The one or more messages associated with the second browsing session cause the server 104 to identify a second set of anonymization characteristics for a second instance of an access application. The second set of anonymization characteristics may correspond to the second set of the sets of anonymization characteristics 155 described above with reference to FIG. 1. The one or more messages associated with the second browsing session additionally cause the server 104 to instantiate, within a second cloud container corresponding to the connection associated with the second browsing session, a second instance of the access application using the second set of anonymization characteristics. For example, the second instance of the access application may correspond to the second instance 154 of the access application 142 described above with reference to FIG. 1 and the second cloud container may correspond to the second cloud container 164.

In these examples, the one or more messages associated with the second browsing session is additionally configured to cause the server 104 to retrieve data using the second instance 154 of the access application 142. The data may be retrieved from the second website, such as the second website 193 of FIG. 1, and may correspond to the fourth data 177 described above with reference to FIG. 1. For example, the second instance 154 of the access application 142 may cause the server 104 to send a request for data to render the second website 193 to one or more servers that host the second website 193. In response to the request from the second instance 154, the one or more servers that host the second website 193 may send data (e.g., the fourth data 177) enabling the server 104 to render the second website 193. In these examples, the method 400 additionally includes receiving data from the server 104 via the connection 129 associated with the second browsing session. The data received by the computing device 102 from the server 104 is determined based on the data retrieved from the second website 193. For example, the data received by the computing device 102 may correspond to the fifth data 143 that is based on the fourth data 177 as described above with reference to FIGS. 1 and 2. The data received by the computing device 102 may correspond to data to render an internet browser application interface. For example, the second instance 154 of the access application 142 may receive the fourth data 177 to render the second website 193, may render the second website 193, and may remotely share the browser application interface of the second website 193 with the computing device 102 by sending the computing device the fifth data 143.

Thus, the one or more processors 122 may use a different instance of the access application 142 (that is instantiated with randomly or pseudo-randomly identified anonymization characteristics within a different cloud container using a randomly or pseudo-randomly assigned IP address) to access (e.g., to retrieve data from) one or more websites for each different browsing session of a user. Using a new cloud container including an instance of the browser application that is instantiated using randomly or pseudo-randomly selected anonymization characteristics (e.g., browser application attributes) and a randomly or pseudo-randomly assigned IP address for each browsing session prevents or limits the ability to identify a user or user patterns.

Figure 5:
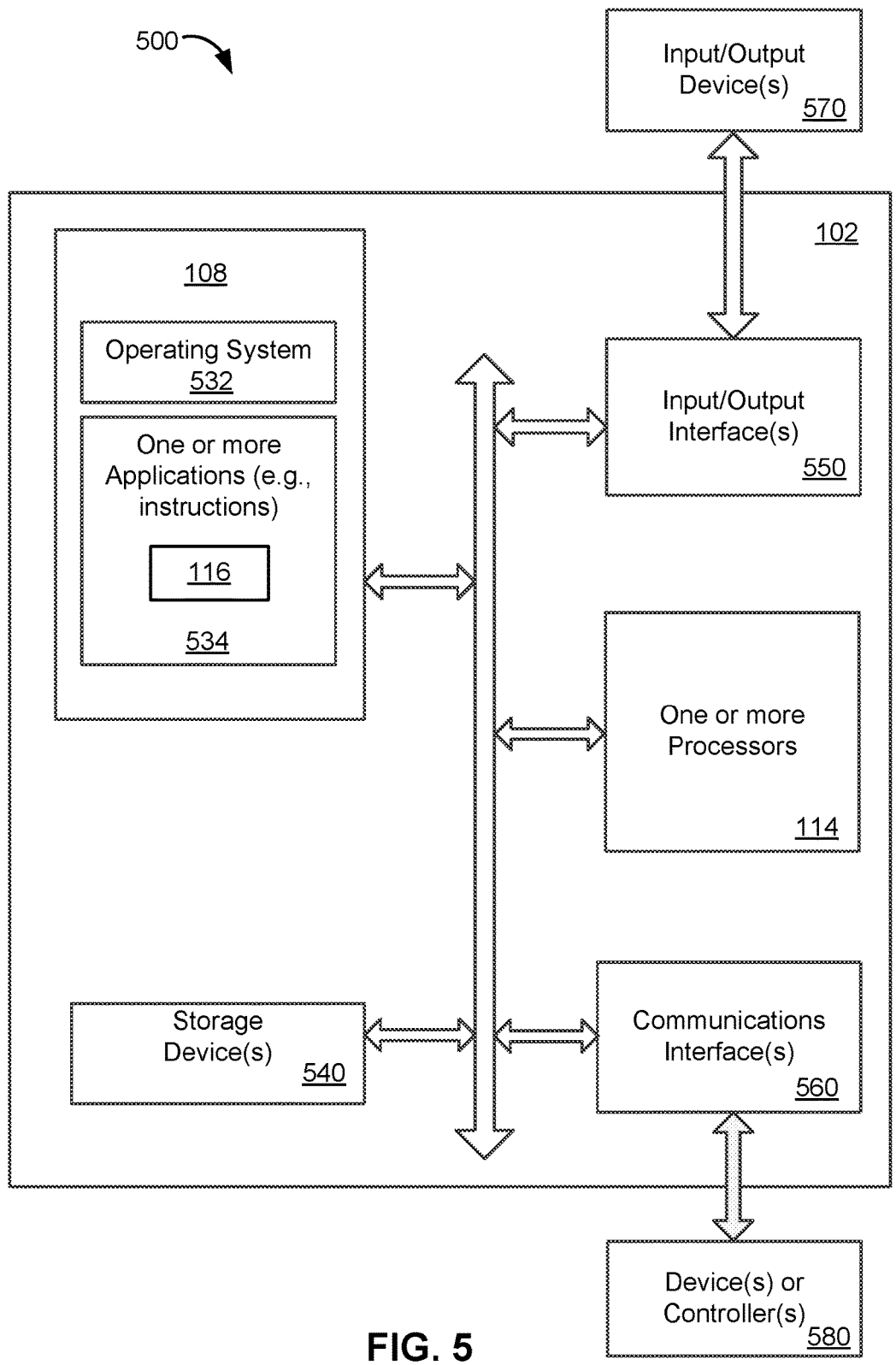
FIG. 5 is a block diagram of a computing environment according to a first embodiment that includes electronic components through which the client device of FIG. 1 may be implemented.

FIG. 5 is a block diagram 500 of a computing environment according to a first embodiment that includes electronic components through which the computing device 102 of FIG. 1 may be implemented. The components in FIG. 5 support embodiments of processor-implemented methods and processor-executable program instructions or code according to the present disclosure. For example, the computing device 102, or portions thereof, may execute instructions to perform the functions or methods of the computing device 102 described above with reference to FIGS. 1, 2, and 4.

In FIG. 5, the computing device 102 may include one or more processors 114. The one or more processors 114 may communicate with the memory 108 (e.g., system memory), one or more storage devices 540 on which a storage data structure or database is located, one or more input/output interfaces 550, one or more communications interfaces 560, or a combination thereof.

The memory 108 may include volatile memory devices (e.g., random access memory (RAM) devices), nonvolatile memory devices (e.g., read-only memory (ROM) devices, programmable read-only memory, and flash memory), or both. The memory 108 may include an operating system 532, which may include a basic/input output system for booting the computing device 102 as well as a full operating system to enable the computing device 102 to interact with users, other programs, and other devices. The memory 108 may include one or more applications 534 (including the application program 116 of FIG. 1) which may be executable by the one or more processors 114, such as a method to anonymously browse (e.g., the method 400 of FIG. 4 described above). For example, the application program 116 may include instructions executable by the one or more processors 114.

The one or more processors 114 may also communicate with one or more storage devices 540. For example, the one or more storage devices 540 may include nonvolatile storage devices, such as magnetic disks, optical disks, or flash memory devices. The storage devices 540 may include both removable and non-removable memory devices. The storage devices 540 may be configured to store an operating system, images of operating systems, applications, and program data. In a particular embodiment, the memory 108, the storage devices 540, or both, include tangible non-transitory computer-readable media.

The one or more processors 114 may also communicate with one or more input/output interfaces 550 that enable the computing device 102 to communicate with one or more input/output devices 570 to facilitate user interaction. The input/output interfaces 550 may include serial interfaces (e.g., universal serial bus (USB) interfaces or Institute of Electrical and Electronics Engineers (IEEE) 1394 interfaces), parallel interfaces, display adapters, audio adapters, and other interfaces. The input/output devices 570 may include keyboards, pointing devices, displays, speakers, microphones, touch screens, magnetic field generation devices, magnetic field detection devices, and other devices. The one or more processors 114 may detect interaction events based on user input received via the input/output interfaces 550. Additionally, the processor 114 may send a graphical user interface (GUI) and related elements to a display device via the input/output interfaces 550.

The one or more processors 114 may communicate with devices or controllers 580 via the one or more communications interfaces 560. The one or more communications interfaces 560 may include wired Ethernet interfaces, IEEE 802 wireless interfaces, other wireless communication interfaces, or other network interfaces. The devices or controllers 580 may include host computers, servers (e.g., the server 104 of FIG. 1), workstations, and other computing devices.

Figure 6:
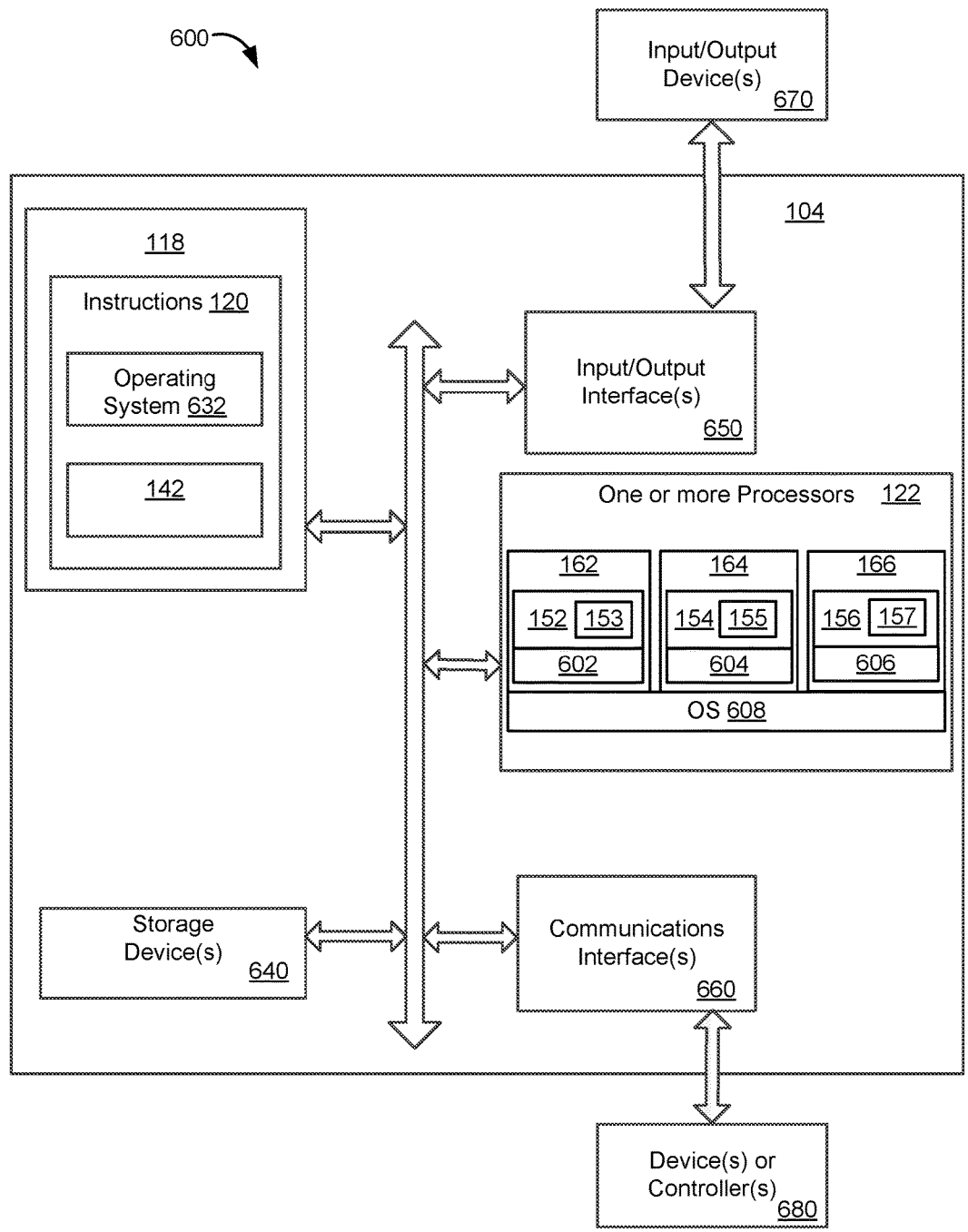
FIG. 6 is a block diagram of a computing environment according to a first embodiment that includes electronic components through which the server of FIG. 1 may be implemented.

FIG. 6 is a block diagram 600 of a computing environment according to a first embodiment that includes electronic components through which the server 104 of FIG. 1 may be implemented. The components in FIG. 6 support embodiments of processor-implemented methods and processor-executable program instructions or code according to the present disclosure. For example, the server 104, or portions thereof, may execute instructions to perform the functions or methods of the server 104 described above with reference to FIGS. 1, 2, and 3.

In FIG. 6, the server 104 may include one or more processors 122. The one or more processors 122 may communicate with the memory 118 (e.g., system memory), one or more storage devices 640 on which a storage data structure or database is located, one or more input/output interfaces 650, one or more communications interfaces 660, or a combination thereof.

The memory 118 may include volatile memory devices (e.g., random access memory (RAM) devices), nonvolatile memory devices (e.g., read-only memory (ROM) devices, programmable read-only memory, and flash memory), or both. The memory 118 may include processor-executable instructions 120. The processor-executable instructions are executable by the one or more processors 122. The processor-executable instructions 120 include operating system instructions 632. The operating system instructions 632 may include a basic/input output system for booting the server 104 as well as instructions for a full operating system to enable the server 104 to interact with other programs and/or other devices (e.g., such as the computing device 102 of FIG. 1). The processor-executable instructions 120 include one or more applications including the access application 142.

When executed by the one or more processors 122, the processor-executable instructions 120 may use the access application 142 to perform one or more functions or operations described with reference to the server 104 of FIGS. 1, 2, and/or 3. For example, the processor-executable instructions 120, when executed by the one or more processors 114 may be configured to cause the one or more processors 122 to establish the connection 129 of FIG. 1 with a computing device, such as the computing device 102. The processor-executable instructions 120, when executed by the one or more processors 122 may additionally be configured to cause the one or more processors 122 to identify one or more sets of the sets of anonymization characteristics 153, 155, and 157 as described above with reference to FIGS. 1-4.

When executed by the one or more processors 122, the processor-executable instructions 120 may additionally be configured to cause the one or more processors 122 to create one or more cloud containers of the cloud containers 162, 164, and 166. The cloud containers 162, 164, and 166 may share a host operating system (OS) 608. To cloud containers 162, 164, and 166 may share bins/libraries or may have individual bins/libraries 602, 604, and 606, respectively.

When executed by the one or more processors 122, the processor-executable instructions 120 may additionally be configured to cause the one or more processors 122 to instantiate one or more instances of the access application 142. For example, the one or more processors 122 may instantiate the instances 152, 154, and 156 within corresponding cloud containers 162, 164, and 166, respectively, as described above with reference to FIGS. 1-4.

The one or more processors 122 may also communicate with one or more storage devices 640. For example, the one or more storage devices 640 may include nonvolatile storage devices, such as magnetic disks, optical disks, or flash memory devices. The storage devices 640 may include both removable and non-removable memory devices. The storage devices 640 may be configured to store an operating system, images of operating systems (e.g., the OS 608), applications, and program data. In a particular embodiment, the memory 118, the storage devices 640, or both, include tangible non-transitory computer-readable media.

The one or more processors 122 may also communicate with one or more input/output interfaces 650 that enable the server 104 to communicate with one or more input/output devices 670 to facilitate user interaction. The input/output interfaces 650 may include serial interfaces (e.g., universal serial bus (USB) interfaces or Institute of Electrical and Electronics Engineers (IEEE) 1394 interfaces), parallel interfaces, display adapters, audio adapters, and other interfaces. The input/output devices 670 may include keyboards, pointing devices, displays, speakers, microphones, touch screens, magnetic field generation devices, magnetic field detection devices, and other devices. The one or more processors 122 may detect interaction events based on user input received via the input/output interfaces 650. Additionally, the one or more processors 122 may send a graphical user interface (GUI) and related elements to a display device via the input/output interfaces 650.

The one or more processors 122 may communicate with devices or controllers 680 via the one or more communications interfaces 660. The one or more communications interfaces 660 may include wired Ethernet interfaces, IEEE 802 wireless interfaces, other wireless communication interfaces, or other network interfaces. The devices or controllers 680 may include host computers, servers (e.g., one or more servers of the websites 191, 193, and/or 195), workstations, and other computing devices (e.g., such as the computing device 102).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
sending one or more messages, from a computing device to a server, to cause the server to establish a connection with the computing device, to cause the server to identify a first set of anonymization characteristics, the first set of anonymization characteristics identified independently of the one or more messages, and to cause the server to instantiate a first instance of an access application within a first cloud container using the first set of anonymization characteristics, wherein the first set of anonymization characteristics correspond to application settings for the first instance of the access application; and
receiving, by the computing device, second data from the server via the connection, the second data determined based on first data received by the server from a first website using the first instance of the access application.

2. The method of claim 1, wherein the first cloud container is associated with the connection such that access to the first cloud container is restricted to computing devices communicating with the server via the connection.

3. The method of claim 2, wherein the access application corresponds to an internet browser application.

4. The method of claim 3, wherein the second data corresponds to an internet browser application interface.

5. The method of claim 4, further comprising:
sending, to the server via the connection, third data to cause the server to identify a second set of anonymization characteristics and to instantiate a second instance of the access application within a second cloud container using the second set of anonymization characteristics; and
receiving, by the computing device, fifth data from the server, the fifth data determined based on fourth data received by the server from a second website using the second instance of the access application.

6. The method of claim 5,
wherein the first set of anonymization characteristics is identified, and the first instance of the access application is instantiated, to access the first website during a browsing session, and
wherein the second set of anonymization characteristics is identified, and the second instance of the access application is instantiated, to access the second website during the browsing session.

7. The method of claim 1, wherein the first set of anonymization characteristics includes browser attributes that include browser plugins, system fonts, or both.

8. An apparatus comprising:
a memory storing processor-executable instructions; and
one or more processors coupled to the memory and configured to execute the processor-executable instructions, wherein the processor-executable instructions, when executed by the one or more processors, cause the one or more processors to:
initiate sending of one or more messages to a server to cause the server to establish a connection with a computing device that includes the one or more processors, to cause the server to identify a first set of anonymization characteristics, the first set of anonymization characteristics identified independently of the one or more messages, and to cause the server to instantiate a first instance of an access application within a first cloud container using the first set of anonymization characteristics, wherein the first set of anonymization characteristics correspond to application settings for the first instance of the access application; and
receive second data from the server via the connection, the second data determined based on first data received by the server from a first website using the first instance of the access application.

9. The apparatus of claim 8, wherein the first cloud container is associated with the connection such that access to the first cloud container is restricted to computing devices communicating with the server via the connection.

10. The apparatus of claim 9, wherein the access application corresponds to an internet browser application.

11. The apparatus of claim 10, wherein the second data corresponds to an internet browser application interface.

12. The apparatus of claim 11, wherein the processor-executable instructions further include instructions that, when executed by the one or more processors, cause the one or more processors to:
initiate sending, to the server via the connection, third data to cause the server to identify a second set of anonymization characteristics and to instantiate a second instance of the access application within a second cloud container using the second set of anonymization characteristics; and
receive fifth data from the server, the fifth data determined based on fourth data received by the server from a second website using the second instance of the access application.

13. The apparatus of claim 12,
wherein the first set of anonymization characteristics is identified, and the first instance of the access application is instantiated, to access the first website during a browsing session, and
wherein the second set of anonymization characteristics is identified, and the second instance of the access application is instantiated, to access the second website during the browsing session.

14. The apparatus of claim 8, wherein the first set of anonymization characteristics are generated randomly, pseudo-randomly, or both.

15. A non-transitory processor-readable medium storing processor-executable instructions that, when executed by one or more processors, cause the one or more processors to:
initiate sending of one or more messages to a server to cause the server to establish a connection with a computing device that includes the one or more processors, to cause the server to identify a first set of anonymization characteristics, the first set of anonymization characteristics identified independently of the one or more messages, and to cause the server to instantiate a first instance of an access application within a first cloud container using the first set of anonymization characteristics, wherein the first set of anonymization characteristics correspond to application settings for the first instance of the access application; and
receive second data from the server via the connection, the second data determined based on first data received by the server from a first website using the first instance of the access application.

16. The non-transitory processor-readable medium of claim 15, wherein the first cloud container is associated with the connection such that access to the first cloud container is restricted to computing devices communicating with the server via the connection.

17. The non-transitory processor-readable medium of claim 16, wherein the access application corresponds to an internet browser application.

18. The non-transitory processor-readable medium of claim 17, wherein the second data corresponds to an internet browser application interface.

19. The non-transitory processor-readable medium of claim 18, wherein the processor-executable instructions further include instructions that, when executed by the one or more processors, cause the one or more processors to:
send, to the server via the connection, third data to cause the server to identify a second set of anonymization characteristics and to instantiate a second instance of the access application within a second cloud container using the second set of anonymization characteristics; and
receive fifth data from the server, the fifth data determined based on fourth data received by the server from a second website using the second instance of the access application.

20. The non-transitory processor-readable medium of claim 19,
wherein the first set of anonymization characteristics is identified, and the first instance of the access application is instantiated, to access the first website during a browsing session, and wherein the second set of anonymization characteristics is identified, and the second instance of the access application is instantiated, to access the second website during the browsing session.

* * * * *